Patented June 26, 1951

2,558,167

UNITED STATES PATENT OFFICE 2,558,167

RUST REMOVER

Adolfo J. Beghin, Tuckahoe, Philip F. Hamberg, Jr., Forest Hills, and Howard E. Smith, Briarcliff Manor, N. Y., assignors, by mesne assignments, to Insl-X Corporation, Briarcliff Manor, N. Y., a corporation of New Jersey No Drawing. Application May 22, 1947, Serial No. 749,862

4 Claims. (Cl. 252—136)

This invention relates to improvements in rust removing compositions. The proper application of these compositions and the prevention of after-rust are also covered. More particularly it relates to a rust removing composition which is in a gelatinous or pasty form.

This application is a continuation-in-part of application Serial No. 645,226, filed Feb. 2, 1946.

It has long been recognized in the art that, because of certain chemical and physical properties, the phosphoric acids are among the best acid type rust removers. Certain deficiencies in the simple phosphoric acid solutions when used as rust removers have also been recognized. For example, it has already been proposed to improve the properties of phosphoric acid rust removers by adding sulfonated aromatic compounds, alcohols, oils, glycols, sulfonated higher fatty alcohols, and so forth, to improve the wetting properties, the adhesiveness and to increase the viscosity of such rust removing compositions. For certain cases these compounds are useful; but, in the case of positional structural steel, they leave much to be desired. Field tests have shown that these compounds in use adhere poorly, cover poorly, and when allowed to dry on the surface as recommended by the manufacturer leave substances not beneficial to painting.

The addition of methyl and ethyl cellulose ethers has also been suggested to improve the viscosity characteristics of phosphoric acid rust removing compositions. Storage tests have shown these compounds to turn black in color indicating decomposition of the cellulose by the acid. These compositions do not give the gel covered by this invention, nor do they give the same white color.

In application Serial No. 645,226 there was disclosed a phosphoric acid type of rust remover which is far superior to the prior rust removers in that it is thicker or more viscous (it is a paste rather than a liquid), more adherent to metal surfaces, more spreadable over metal surfaces, and more effective to remove rust (especially heavy rust). The rust remover disclosed in said application has one disadvantage, however, in that it should be used within a month after it is made. After the composition has stood for one or two months it begins to separate into several layers and is no longer in the form of a homogeneous gel paste.

An object of this invention is to produce a homogeneous phosphoric acid rust remover paste which is substantially permanently stable.

These and other objects are accomplished by making a rust remover from phosphoric acid, water and with added sodium carboxyalkyl cellulose to produce a pasty mass and by adding a stabilizer comprising pectin thereto.

The novel features that we consider characteristic of this invention are set forth with particularity in the appended claims. The invention itself, however, both as to its organization and its method of operation, together with additional objects and advantages thereof, will best be understood from the following description of a specific embodiment when read in connection with the following examples.

*Example*

Heat to 70° C. 150 grams of tap water. Stir vigorously and slowly add 13.5 grams of high viscosity sodium carboxymethyl cellulose which has been sifted through a 100 mesh screen. When the cellulose is almost all in solution, and not before, add 150 grams of phosphoric acid, 85% U. S. P. quality, and stir continuously. To this paste-like composition there is then stirred in 3 grams of citrus pectin.

Sodium carboxymethyl cellulose which has been sifted through a 100 mesh screen gives the best product, with a 50 mesh screen size being second best. Larger particles will gel also, but may give some clumps in the final product.

If the acid is added to the water before the cellulose or if the water or mixture is heated too high or too long, a liquid and not a gel product will result.

The amount of sodium carboxymethyl cellulose can be varied from 1 gram to 15 grams. The cellulose can be of the low, medium or high viscosity type. The high viscosity type is to be preferred. The low concentrations of cellulose give gels which turn liquid soon. The high concentrations remain gels too long and have poor brushing properties. The best range is from 4 to 10 grams. The best combination for immediate use is 8 grams of cellulose. It is also possible to dilute the highly concentrated compositions with water heated to 100° C. and stirring for immediate use.

The amount of pectin which may be added may be varied from about 0.5 to 5 grams in the example (or from about 3 to 30% based on the weight of the sodium carboxymethyl cellulose). Any amount of the pectin improves the stability of the paste. The pectin also increases the viscosity of the composition. The pectin may be derived from any source but citrus pectin is preferred because of its availability. If desired the amount of the sodium carboxymethyl cellulose can be decreased when larger amounts of pectin are added but since pectin is more expensive this offers no particular advantage.

A general idea of the methods of using the composition to remove rust may be obtained from the following.

Preferably, heavily rusted surfaces are first vigorously brushed with a wire brush. All loose rust and scale is wiped off or removed with an appropriate instrument if wire brushing is unsatisfactory. A coating of the above rust removing composition is then applied by brush, swab, trowelling, or in any other known manner. The coated rusted surface is allowed to stand about 15 minutes, for example, and is then removed. The coating is squeezed off and the surface wiped. If this is not practical the coating may be hosed off by water. If water is used when the surface has dried a film of light rust will form. This is true no matter what rust remover is used prior to hosing. This can be prevented by wetting the hosed-off surface while still wet with a weak acid solution. Twenty per cent citric acid has been found to be most practical. This second wash is then allowed to air dry to prevent this after-rust. Others suggest the use of an alkaline solution for this purpose but the acid solution is far better from our tests. One coat of rust remover, if a good wire-brushing job has been done, should be sufficient. If a second coat is necessary it is applied after the hosing and before the citric acid wash.

For lightly rusted surfaces, the wire-brushing step is not necessary, and usually one treatment with the rust removing composition is sufficient. The coating may be removed sooner than 15 minutes if desired.

This new composition can also be used to remove stains from copper and other metals and alloys.

Citric acid, trichloroacetic, lactic and other organic acids can be substituted for all or a part of the phosphoric acid in our composition, although the rust removing effect is not quite as good as with phosphoric acid.

The sodium carboxymethyl cellulose may also be described as the sodium salt of cellulose glycollic acid. In place of the sodium carboxymethyl cellulose, the sodium salt of cellulose lactic acid or other sodium carboxyalkyl celluloses may be used.

Although we have shown and described certain specific embodiments of our invention, we are fully aware that many modifications thereof are possible. Our invention, therefore, is not to be restricted except insofar as is necessitated by the prior art and by the spirit of the appended claims.

We claim:

1. A rust removing gel composition consisting of a mixture of a water soluble, rust attacking acid selected from the group consisting of phosphoric acid, citric acid and trichloracetic acid, water, 1/3–5%, based on the weight of the water and acid, of sodium carboxymethyl cellulose as a gel forming agent, and 3–30%, based on the weight of the sodium carboxymethyl cellulose, of pectin as a gel stabilizer.

2. A rust removing gel composition consisting of a mixture of 85% U. S. P. quality phosphoric acid and water, in substantially equal proportions, 1/3–5%, based on the weight of the water and acid, of sodium carboxymethyl cellulose as a gel forming agent, and 3–30%, based on the weight of the sodium carboxymethyl cellulose, of pectin as a gel stabilizer.

3. A rust removing gel composition consisting of a mixture of citric acid, water, 1/3–5%, based on the weight of the water and acid, of sodium carboxymethyl cellulose as a gel forming agent, and 3–30%, based on the weight of the sodium carboxymethyl cellulose, of pectin as a gel stabilizer.

4. A rust removing gel composition consisting of a mixture of trichloracetic acid, water, 1/3–5%, based on the weight of the water and acid, of sodium carboxymethyl cellulose as a gel forming agent, and 3–30%, based on the weight of the sodium carboxymethyl cellulose, of pectin as a gel stabilizer.

ADOLFO J. BEGHIN.
PHILIP F. HAMBERG, Jr.
HOWARD E. SMITH.

REFERENCES CITED

The following references are of record in the file of this patent:

UNITED STATES PATENTS

| Number | Name | Date |
|---|---|---|
| 2,221,968 | Friedman | Nov. 19, 1940 |
| 2,340,072 | Medl, Jr. | Jan. 25, 1944 |

OTHER REFERENCES

Sodium Carboxymethylcellulose, Booklet of Hercules Powder Co., Wilmington, Del. (1944), pages 1–4.

CMC, Booklet of Hercules Powder Co., Wilmington, Del. (1945), pages 1–4.

New Products and Materials, Chem. and Met. Engin. (March 1944), pages 139 and 140.